(12) United States Patent
Odlum

(10) Patent No.: US 12,482,017 B2
(45) Date of Patent: Nov. 25, 2025

(54) IMPRESSION EFFECTIVENESS WITH GREATER LOCATION AND TIME GRANULARITY

(71) Applicant: Bliss Point Media, Inc., Santa Monica, CA (US)

(72) Inventor: Sean Odlum, Santa Monica, CA (US)

(73) Assignee: Bliss Point Media, Inc., Santa Monica, CA (US)

( * ) Notice: Subject to any disclaimer, the term of this patent is extended or adjusted under 35 U.S.C. 154(b) by 0 days.

(21) Appl. No.: 18/483,635

(22) Filed: Oct. 10, 2023

(65) Prior Publication Data

US 2024/0185293 A1    Jun. 6, 2024

Related U.S. Application Data

(60) Provisional application No. 63/379,128, filed on Oct. 11, 2022.

(51) Int. Cl.
*G06Q 30/0241* (2023.01)
*G06Q 30/0204* (2023.01)
*G06Q 30/0242* (2023.01)

(52) U.S. Cl.
CPC ..... *G06Q 30/0246* (2013.01); *G06Q 30/0205* (2013.01)

(58) Field of Classification Search
None
See application file for complete search history.

(56) References Cited

U.S. PATENT DOCUMENTS

| | | | | |
|---|---|---|---|---|
| 11,367,083 | B1* | 6/2022 | Saurabh | G06Q 30/02 |
| 2007/0078707 | A1* | 4/2007 | Axe | G06Q 30/02 |
| | | | | 705/14.69 |
| 2008/0098420 | A1* | 4/2008 | Khivesara | G06Q 30/02 |
| | | | | 725/32 |
| 2012/0303445 | A1* | 11/2012 | Jablokov | G06Q 30/0251 |
| | | | | 705/14.42 |
| 2012/0303447 | A1* | 11/2012 | Hughes | G06Q 30/0255 |
| | | | | 705/14.69 |
| 2014/0172573 | A1* | 6/2014 | Saurabh | G06Q 30/0261 |
| | | | | 705/14.58 |
| 2014/0297394 | A1* | 10/2014 | Li | H04N 21/41415 |
| | | | | 705/14.55 |
| 2015/0294370 | A1* | 10/2015 | Nagarajayya | G06Q 30/0275 |
| | | | | 705/14.66 |
| 2018/0225587 | A1* | 8/2018 | Khidekel | G06Q 30/0201 |
| 2021/0110432 | A1* | 4/2021 | Chen | G06F 16/2237 |
| 2022/0012770 | A1* | 1/2022 | Barton | G06Q 50/26 |

* cited by examiner

*Primary Examiner* — Vincent M Cao
(74) *Attorney, Agent, or Firm* — Perkins Coie LLP; Colin Fowler; Benjamin Desch

(57) ABSTRACT

Introduced herein are methods and systems for use of machine learning to measure effectiveness of an impression with specified granularity. For example, the methods and systems herein involve inputting impression data associated with an impression into a machine learning model to assess effectiveness of an impression under specific and narrow time and location parameters, thereby enabling assessments to be conducted in a more frequent and targeted manner.

23 Claims, 5 Drawing Sheets

IMPRESSION EFFECTIVENESS WITH GREATER LOCATION AND TIME GRANULARITY

CROSS-REFERENCE TO RELATED APPLICATIONS

This application claims priority to U.S. Application No. 63/379,128 filed Oct. 11, 2022, which is incorporated in its entirety.

TECHNICAL FIELD

This disclosure relates to the use of machine learning to measure effectiveness of an impression with specified granularity.

BACKGROUND

Present systems for measuring effectiveness of an impression are constrained. There are several issues with typical collection of data used for measuring effectiveness of an impression (e.g., impression data). Since data is collected from disparate sources, analysis becomes limited to the source providing the minimum granularity. There is no flexibility to perform analyses based on data with greater granularity. For example, data may span weeks or years following the conclusion of an impression campaign, causing a delay in assessment of impressions. Another issue is that data privacy regulations can prevent collection of desired impression data. For example, third-party cookies are often used by web browser software or digital application software to collect impression data. However, some providers of browsers and applications are phasing out support of such cookies to comply with new data privacy regulations. Thus, an analysis system and method that allows for seamless integration of analysis under greater granularity and that is privacy and regulation friendly is needed.

DETAILED DESCRIPTION

Marketers want to analyze whether their marketing campaigns are effective and act as soon as possible if there is something that can be changed to improve their campaigns. Naturally, given the large amount of impression data that is collected across a plurality of data service providers, there is a delay between analyzing impression data to determine effectiveness of impressions. When there is too long of a delay, the resulting analysis may no longer be relevant or helpful in indicating how a campaign should be updated. Having a way to analyze impression data with narrower time granularity (e.g., 5-minute intervals during an impression campaign) would thus improve relevancy of resulting impression data analysis. Further, given that collected impression data covers large geographic areas, the resulting analysis may fail to reflect nuances between specific smaller regions. Having a way to analyze impression data isolated to smaller regions would thus improve relevancy of resulting impression data analysis. Herein described is a system and method for using machine learning to assess effectiveness of an impression delivered by media platform service providers under specified granularity (e.g., narrow time and location parameters), thereby enabling assessments to be conducted in a more frequent and targeted manner.

Figure 1:
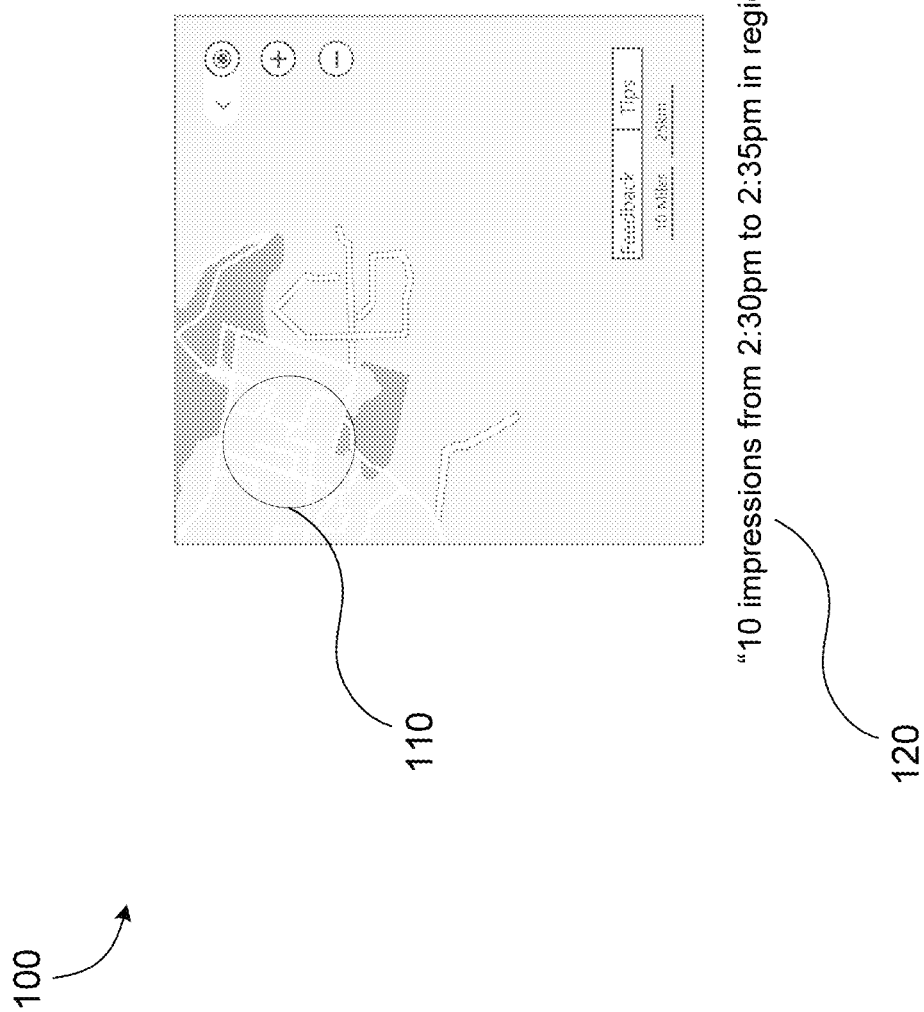
FIG. 1 is an illustration showing a region in which an impression is analyzed under location and time granularity.

FIG. 1 is an illustration 100 showing a region 110 in which an impression is analyzed under location and time granularity. An impression includes content that can be delivered through various media, such as the web page, web application, or mobile application. Impression data includes data indicating information about an impression, such as details about its content, length of time displayed, time at which it ran, location at which it ran, etc. Illustration 100 indicates an example of the granularity at which impression data can be limited geographically. Region 110 consists of a portion of a neighborhood. Output 120 indicates an exemplary output to a query regarding impression data limited to a specified location and time period. Output 120 shown in FIG. 1 provides text indicating that there were 10 impressions captured within region 110 during the five-minute interval from 2:30 pm to 2:35 pm. Output 120 need not be limited to the format shown in FIG. 1. In some embodiments, output 120 is in the form of an entry to a data table or list that organizes relevant information by field (e.g., number of impressions, region, length of time interval, time interval start, time interval end, etc.), a graph, a chart, or other visualization.

Figure 2:
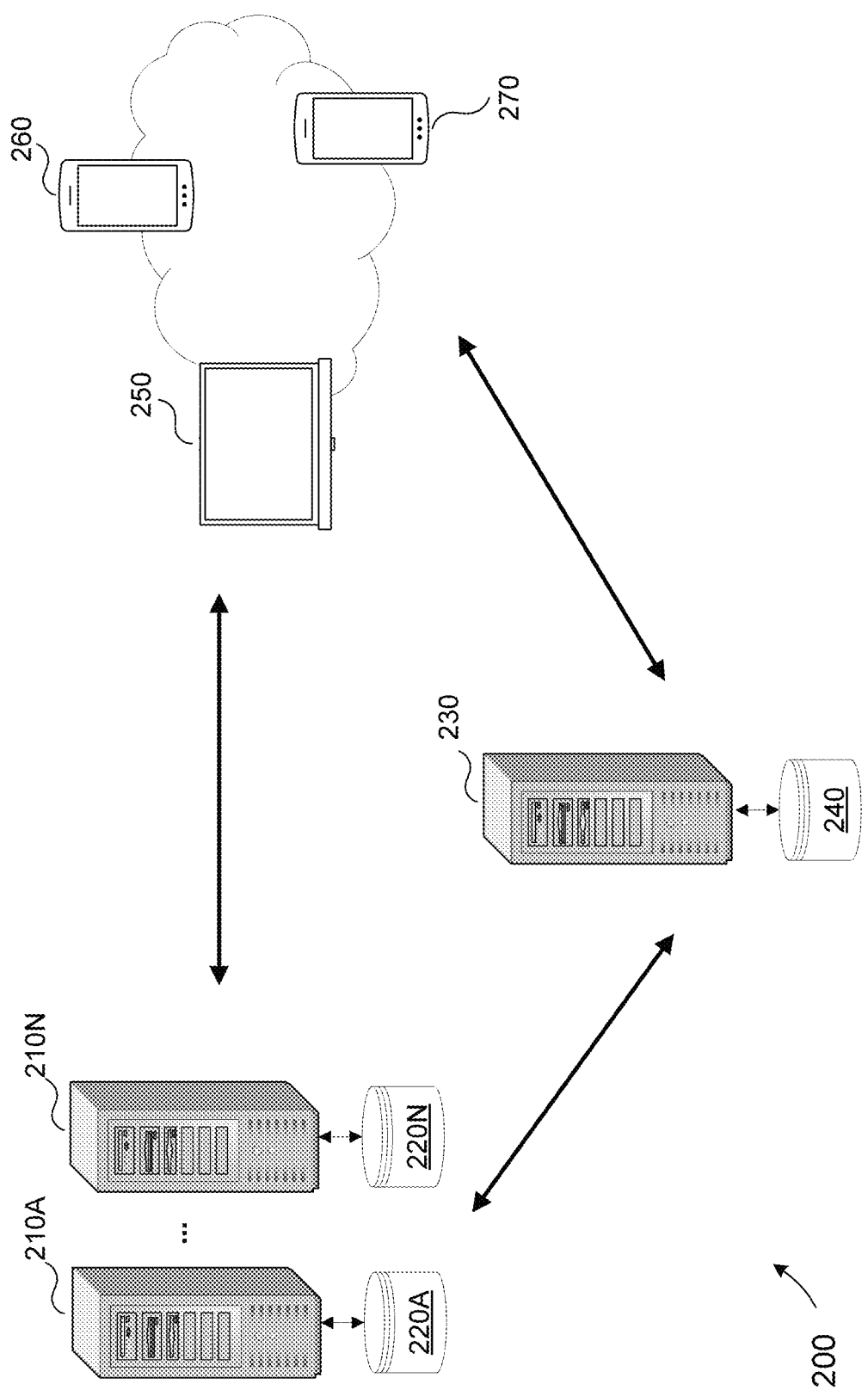
FIG. 2 illustrates a diagrammatic representation of an exemplary system for performing methods described herein.

FIG. 2 illustrates a diagrammatic representation of an exemplary system 200 for performing methods described herein. Devices shown in system 200 are in communication over any suitable communications network that allows remote devices to communicate with each other.

FIG. 2 includes servers 210A through 210N with their respective databases 220A through 220N. Servers 210A through 210N are servers maintained by data hosting services. In some embodiments, servers 210A through 210N are maintained by various media platform service providers (e.g., online application providers, website providers, etc.), which host impression data in their respective databases 220A through 220N. Servers 210A through 210N collect impression data from devices that use their services, which may include any subset or all of user devices 250, 260, and 270. User devices 250, 260, and 270 are devices (e.g., smartphone, tablet, laptop, etc.) capable of receiving and sending data regarding an impression over a communications network and presenting the impression. Server 230 is a server that performs methods of analyzing impression data as described herein. Server 230 hosts data in database 240 based on information received from any of servers 210A through 210N, data bases 220A through 220N, and user devices 250, 260, and 270.

While FIG. 2 shows an exemplary number of devices, it is understood that system 200 as shown is not limiting. For example, system 200 can include a smaller or greater number of devices as appropriate. For example, system 200 can include any suitable number of servers similar to servers 210A through 210N, databases similar to 220A through 220N, and user devices similar to user devices 250, 260, 270. System 200 can also include additional databases per server. Further, server 230 may consist of several servers.

Figure 3:
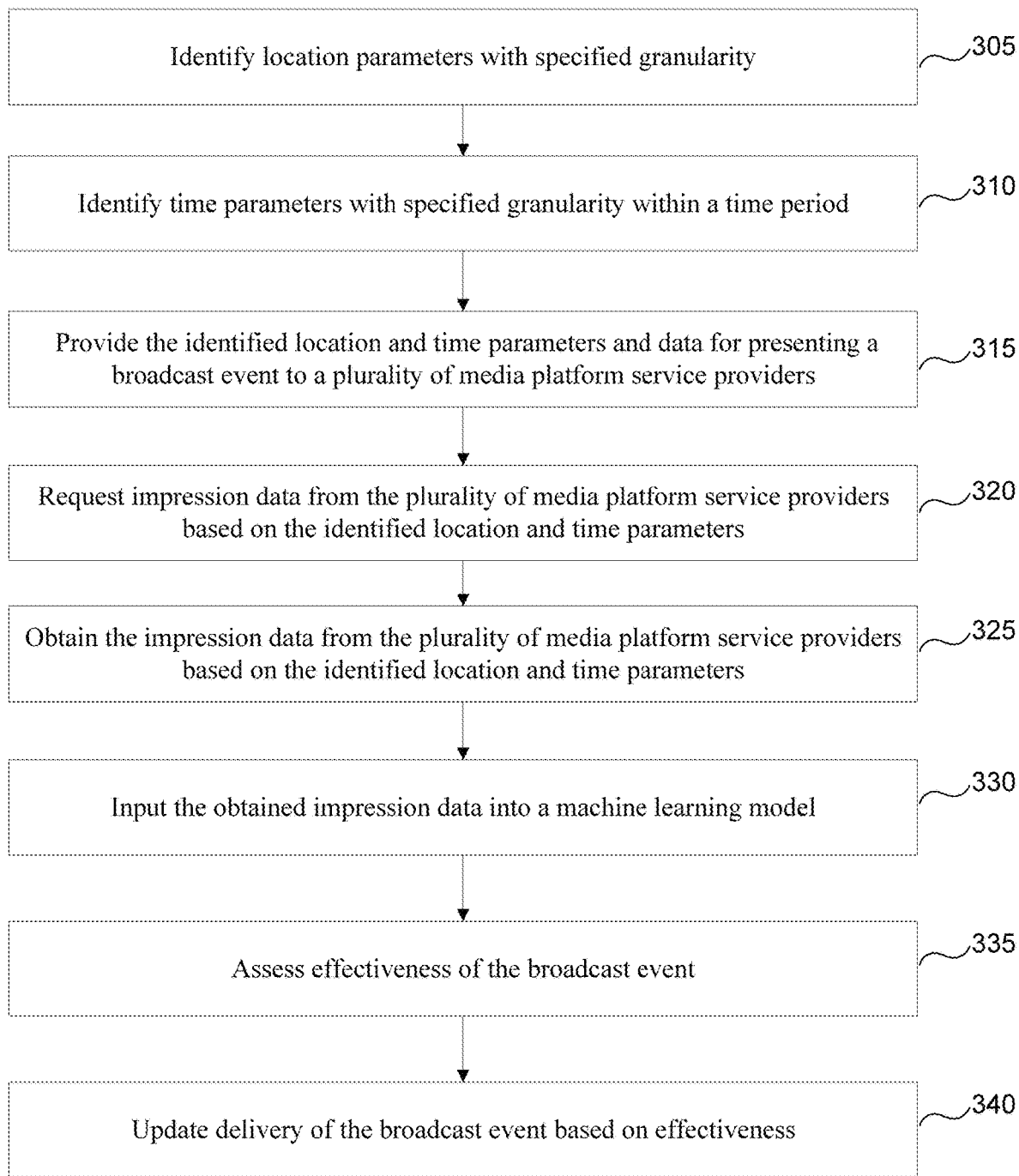
FIG. 3 is a flow diagram illustrating an exemplary method for measuring the effectiveness of an impression with greater location and time granularity.

FIG. 3 is a flow diagram illustrating an exemplary method 300 for measuring the effectiveness of an impression with greater location and time granularity. Certain steps are explained with respect to devices shown in system 200 of FIG. 2. In some embodiments, exemplary method 300 is performed by a server, such as server 230.

It is understood that certain steps of exemplary method 300 need not occur in the exact order shown in FIG. 3. For example, step 310 can occur before step 305, or steps 305 and 310 can occur simultaneously. Additionally, steps 340 can occur before step 335, or steps 335 and 340 can occur simultaneously.

At step 305, a server identifies location parameters with specified granularity. While impression campaigns are typically analyzed based on broad geographical location, embodiments herein allow analysis of impression data based on narrower geography. For example, server 240 identifies that an impression be presented and corresponding impression data be collected within a specific smaller region e.g., such as a specific neighborhood, zip code, city, metropolitan area, town, or suburb. Server 240 can identify the specified location using any data suitable for identifying a region, such as a set of geographical coordinates, zip code, name or definition (e.g., based on streets, building addresses, etc.) of city, town, metropolitan area, or suburb.

At step 310, the server further identifies time parameters with specified granularity within a time period. While impression campaigns are typically analyzed over long time periods and often after campaigns have been completed, embodiments herein allow analysis of impression data based on narrower time increments. For example, server 240 identifies that an impression be presented and corresponding impression data be collected over specific time increments during the impression campaign. Thus, each identified time increment is shorter than the length of the impression campaign. In some embodiments, the time increments are each a certain number of minutes. Server 240 can identify the specified time increments using any data suitable for identifying time periods, such as a length of the time increments and/or the start and end of each time increment.

At step 315, the server provides the identified location and time parameters and data for presenting an impression to a plurality of media platform service providers. The media platform service providers (e.g., YouTube, TikTok, Instagram, Amazon, etc.) are providers of online applications, websites, or the like that are capable of presenting impressions through its platforms used by user devices. In some embodiments, server 230 provides the plurality of media platform service providers with data suitable for identifying the specific parameters regarding desired location (e.g., a set of geographical coordinates, zip code, or city name) and time (e.g., length of the time increments and/or the start and end of each time increment) identified in steps 305 and 310. Server 230 further provides the plurality of media platform service providers with data for presenting the impression (e.g., data for playing a video advertisement) to the plurality of media platform service providers, which then provide the received data to user devices that are using its services in line with the received time and location parameters.

The plurality of media platform service providers will then determine whether certain user devices are compatible with the identified location and time parameters. For example, servers 210A and 210N associated with media platform service providers determine that user devices 260 and 270 are compatible with the location and/or time parameters identified in steps 305 and 310. In some embodiments, servers 210A and 210N detect the locations of user devices 260 and 270 or look up their location information from device profiles stored within databases 220A and 220N, respectively. If servers 210A and 210N determine that the locations of user devices 260 and 270 are within the specific region identified in step 305, then servers 210A and 210N provide data for playing the impression to user devices 260 and 270 (e.g., see step 401 of exemplary method 400 of FIG. 4). For example, user device 260 plays the impression received from server 210A during playback of a YouTube video, and user device 270 plays the impression received from server 210N in a banner of an Amazon page. In some embodiments, servers 210A and 210N store impression data indicating the content (e.g., company service, or item advertised) of the impression, time that the impression was played by the user devices, and information about the user devices (e.g., device location data, device type data, device activity data, etc.) in databases 220A and 220N, respectively.

At step 320, the server requests impression data from the plurality of media platform service providers based on the identified location and time parameters. Once the impression has been presented to user devices, the server can seek to analyze impression data associated with the impression. For example, server 230 sends a request to servers 210A and 210N requesting impression data associated with the impression for which data was provided in step 315. In some embodiments, the request includes data identifying the impression, and the identified location and time parameters as discussed with respect to steps 305 and 310. If the location and time parameters were already provided to the plurality of media platform service providers in step 315 and the media platform service providers saved the received parameters, the request need not provide the parameters again.

Figure 4:
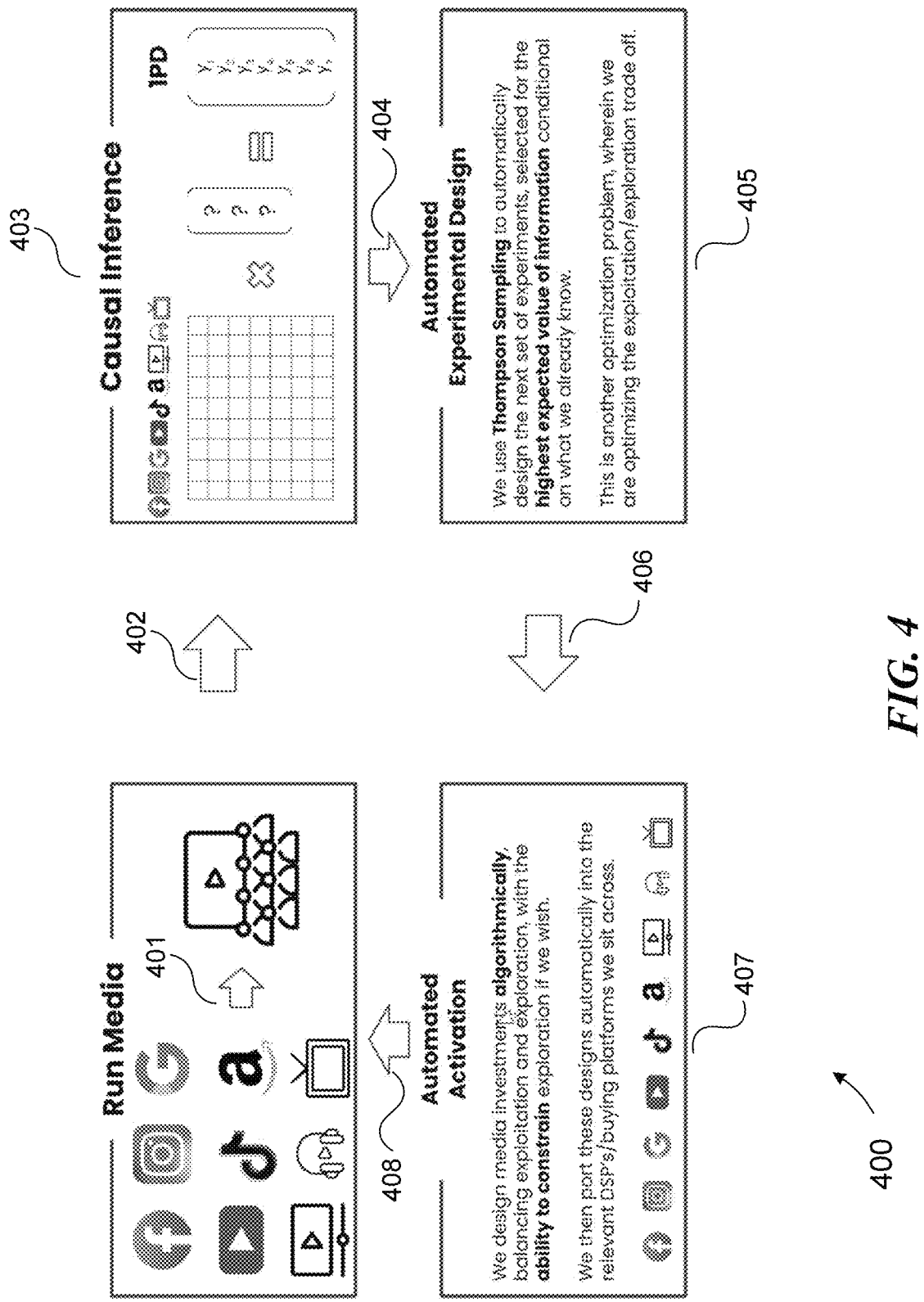
FIG. 4 is a flow diagram showing an exemplary method for measuring the effectiveness of an impression with greater location and time granularity.

At step 325, the server obtains the requested impression data from the plurality of media platform service providers based on the identified location and time parameters (e.g., see step 402 of exemplary method 400 of FIG. 4). For example, if the request provided to servers 201A and 210N in step 320 identifies location and time parameters indicating a specific neighborhood within a set of geographical coordinates and a 5-minute increment (e.g., as shown in FIG. 1), servers 210A and 210N each filters its data stored in databases 220A and 220N, respectively, to isolate impression data associated with the impression, and captured within the specified geographical location and the specified time increment. Servers 210A and 210N then send the isolated impression data to server 230.

While a single time increment is discussed above, it is understood that a request for impression data can span multiple time increments over a time period. For example, when the request specifies 5-minute intervals over an hour, server 230 in response receives impression data for each of the 5-minute intervals from servers 210A and 210N. This allows server 230 to receive impression data relevant to assessing effectiveness of the impression while the impression campaign is still ongoing. Thus, server 230 receives impression data that is more granular in time and location compared to typical systems.

At some point prior to performing step 330, the machine learning model is trained to detect patterns in impression data to determine device activity related to an impression (e.g., detecting a sale performed on a user device that is related to an impression is played by the user device or a nearby device). In some embodiments, the machine learning model has been trained using training sets including impression data pulled from any combination of suitable data sources, some of which may be third party sources.

In some cases, training data includes impression data that is captured from impression tables, pixel tables, postback tables, or auction data. Impression tables include data related to impressions that the server served to streaming display devices, such as timestamps of advertisements streamed and device identification metadata (e.g., IP addresses, cookie identifiers, MAIDs, etc.) of streaming display devices that ran the advertisements. Pixel tables include data received from third party websites (e.g., websites of advertising party) gathered by tracking pixels coded into the websites to send the gathered data to a pixel server. The data gathered by tracking pixels includes time stamps and specific actions performed (clicks, scrolling, downloading, etc.) during website use, as well as device identification metadata (e.g., IP addresses, cookie identifiers, etc.) captured during website use. Postback tables include data received from third party mobile application events (e.g., mobile apps of advertising party), such as time stamps of mobile application use and device identification metadata (e.g., IP addresses, cookie identifiers, etc.) captured during mobile application use. Auction data includes data passed with a bid request and that originates from an advertisement publisher's website or application, such as time stamps of the advertisements published and device identification metadata (e.g., IP addresses, cookie identifiers, MAIDs, etc.) indicating use of the website or application. In some embodiments, auction data includes metadata captured during an auction (e.g., real-time bidding auction).

At step 330, the server inputs the obtained impression data into a machine learning model for assessing effectiveness of the impression (e.g., see steps 403-405 of exemplary method 400 of FIG. 4). The server uses the trained machine learning model to evaluate new impression data by detecting device activity related to the impression. For example, upon receiving the impression data obtained in step 325, the machine learning model determines whether the obtained impression data is related to any device activity data that would indicate a conversion of the impression. In some embodiments, the machine learning model recognizes that certain device activity indicates a conversion, e.g., a web search, access of a website, downloading of data, or completion of a purchase related to a product, company, or platform that was advertised in an impression. In some cases, the timing of the device activity is also assessed, such that the related device activity must have occurred within a certain time period or proximity to the impression. If the machine learning model detects any such conversion scenario in the obtained impression data, the machine learning model makes a positive determination of a conversion.

Taking the example shown in FIG. 1, the server inputs impression data indicated by output 120 ("10 impressions from 2:30 pm to 2:35 pm in region 110") into the machine learning model, which then determines that the ten impressions are related to sales that occurred in region 110 during or shortly following the 5-minute increment during 2:30 pm to 2:35 pm. In some cases, related sales include any purchases of products, items, or services that were advertised by the impression. Embodiments are not limited to detecting related sales as the machine learning model can detect other device activity indicating a conversion (e.g., internet search of advertised product, item, or service; downloading data associated with advertising product, item, or service).

At step 335, server 230 assesses the effectiveness of the impression. In some embodiments, assessment involves determining one or more effectiveness ratings that correlates to the number or frequency of conversions of the impression. In some cases, there are effectiveness ratings for each specified region and time increments for which effectiveness of the impression is analyzed. In some embodiments, there is an overall effectiveness rating of the impression. The effectiveness ratings can be updated each time the machine learning model is run, as described in step 330, for analyzing new impression data associated with the impression. Since analyses is performed based on impression data isolated to specific regions and time periods with high granularity while the impression campaign is ongoing, the effectiveness ratings remain current.

At step 340, the server updates delivery of the impression based on effectiveness determined at step 335 (e.g., see steps 406-408 of exemplary method 400 of FIG. 4). In some embodiments, the effectiveness ratings trigger changes to be made to the impression campaign to increase effectiveness. For example, if effectiveness ratings indicate that the impression results in more conversions in a specific region and during a specific time of day, the impression campaign is updated to request the plurality of media platform service providers to provide the impression to more user devices in that specific region and specific time of day.

Exemplary Computer System

Figure 5:
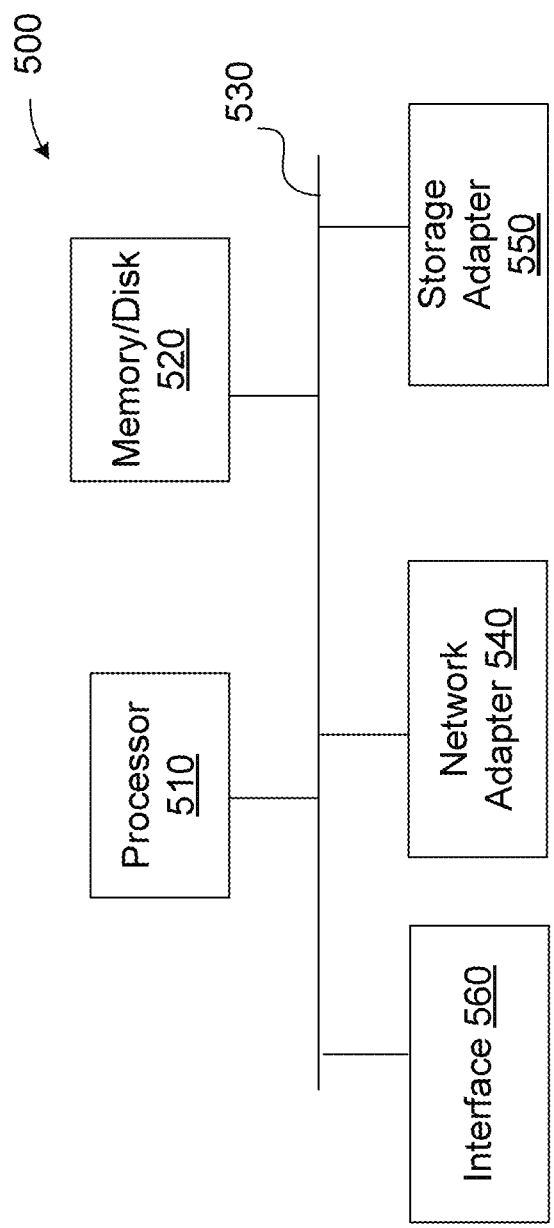
FIG. 5 is a diagrammatic representation of a machine in the example form of a computer system within which a set of instructions, for causing the machine to perform any one or more of the methodologies or modules discussed herein, may be executed.

FIG. 5 is a diagrammatic representation of a machine in the example form of a computer system 500 within which a set of instructions, for causing the machine to perform any one or more of the methodologies or modules discussed herein, may be executed.

The computer system 500 includes a processor 510, memory and non-volatile memory 520, a communications BUS 530, a network adapter 540, a disk interface 550 and an interface device 560. Various common components (e.g., cache memory) are omitted for illustrative simplicity. The computer system 500 is intended to illustrate a hardware device on which any of the components described in the examples (and any other components described in this specification) can be implemented. The components of the computer system 500 are coupled together via the bus 530 or through some other known or convenient device.

This disclosure contemplates the computer system 500 taking any suitable physical form. As an example, and not by way of limitation, a computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform, without substantial spatial or temporal limitation, one or more steps of one or more methods described or illustrated herein. As an example, and not by way of limitation, one or more computer systems 500 may perform in real time or in batch mode one or more steps of one or more methods described or illustrated herein. One or more computer systems 500 may perform at different times or at different locations one or more steps of one or more methods, described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 500. The non-volatile storage can be local, remote, or distributed. The non-volatile memory is optional because systems can be created with all applicable data available in memory. A typical computer system will usually include, at least, a processor, memory, and a device (e.g., a bus) coupling the memory to the processor.

The front-end server interfaces with a user interface, obtaining user inputs relating to, for example, desired parameters. The front-end server can contain infrastructure to perform user management such as log-in information and advertising account information. In some embodiments, the front-end server can also contain a web server that communicates with a user interface. Some embodiments of the front-end server can contain a rendering module in which it can process a user-inputted request. It can load a page, a layout of the page with CSS and JavaScript, and content of the page.

A back-end server behaves as an intermediary between the front-end server, the database server, the machine learning module, and optimization module. The back-end server performs all the computations and processes input and sends this information back to the front-end server. In one embodiment, the back-end server can contain a data verification module that communicates with the database server to verify that the data stored in databases is the most up-to-date data.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 500. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system, and its associated file management system. The file management system is typically stored in the non-volatile memory and/or drive unit and causes the processor to execute the various acts required by the operating system to input and output data and to store data in the memory, including storing files on the non-volatile memory and/or drive unit.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a stand-alone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine, and that cause the machine to perform any one or more of the methodologies or modules of the presently disclosed technique and innovation.

In general, the routines executed to implement the embodiments of the disclosure may be implemented as part of an operating system or a specific application, component, program, object, module or sequence of instructions, referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Further examples of machine-readable storage media, machine-readable media, or computer-readable (storage) media include, but are not limited to, recordable-type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission-type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation; rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application" or "app") may include one or more modules, or a module may include one or more application programs.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully-functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A computer-implemented method for reconciling simultaneous data feeds including data that does not tie specific users to devices comprising:
   providing data to a plurality of servers for presenting an impression to a first plurality of user devices by a web browser or a digital application that does not support third-party cookies;
   providing a combination of location and time parameters to the plurality of servers, wherein the location parameters indicate one or more location identifiers identifying a specified location within a geographic region and the time parameters indicate one or more time identifiers identifying specified time increments within a time period;
   requesting, from the plurality of servers, impression data associated with the combination of location and time parameters, filtered based on a finding that the impression occurred one or more times in the specified location compatible with the one or more location identifiers and within the time period compatible with the one or more time identifiers, wherein the impression data includes one or more of: content of the impression, length of time the impression was displayed, and/or location at which the impression was displayed;
   receiving, from the plurality of servers, simultaneous data feeds including the impression data associated with the combination of location and time parameters, wherein the impression data is collected in real time based on the specified location and time increments within the time period and does not tie specific users to the plurality of user devices;
   identifying, based on historical impression data, patterns in device activity data related to the impression;
   for each of the first plurality of user devices:
      identifying, from impression data associated with the combination of location and time parameters, device activity data associated with content of the impression;
      identifying a user input sequence from the device activity data associated with content of the impression; and
      determining whether the user input sequence matches at least one of the identified patterns in device activity data;
   determining, as a function of determined matches, a rating indicating the effectiveness of the impression associated with the combination of location and time parameters;
   determining that the rating exceeds an expected value; and
   in response to said determination, requesting the plurality of servers to provide the data for presenting the impression to a second plurality of user devices filtered based on a finding that the impression occurred one or more times in the specified location compatible with the one or more location identifiers and within the time period compatible with the one or more time identifiers, wherein the number of user devices in the second plurality of user devices exceeds the number of user devices in the first plurality of user devices.

2. The method of claim 1, wherein the time parameters indicate the specified time increments in units of days, hours or minutes.

3. The method of claim 1, wherein the location parameters indicate the specified location by a designated market area, a zip code, a city name, or geographical coordinates.

4. The method of claim 1, wherein the combination of location and time parameters is a first combination of location and time parameters, further comprising:
   determining that the rating does not exceed an expected value;
   in response to said determination, selecting a second combination of location and time parameters that is different from the first combination of location and time parameters; and
   providing the second combination of location and time parameters to the plurality of servers for analysis according to the method of claim 1.

5. The method of claim 4, wherein selecting the second combination of location and time parameters comprises:
   randomly selecting location and time parameters for the second combination of location and time parameters;
   determining that the second combination of location and time parameters has not been provided to the plurality of the servers for analysis; and
   in response to said determination, selecting the second combination of location and time parameters.

6. The method of claim 1, wherein identifying the user input sequence from the device activity data comprises:
   identifying that the impression data associated with the combination of location and time parameters indicates user input that includes a web search, access of a website, downloading of data, or completion of a purchase related to a product, company, or platform related to the impression;
   identifying, from the impression data associated with the combination of location and time parameters, a time that the user device displayed the impression; and
   identifying that the user input was provided within a certain proximity to the time that the impression occurred.

7. The method of claim 1, wherein the impression data associated with the combination of location and time parameters includes data indicating device identification metadata, and device activity data collected from impression tables, pixel tables, postback tables, or auction data.

8. A system for reconciling simultaneous data feeds including data that does not tie specific users to devices comprising:
   a processor; and
   a memory including instructions that when executed, cause the processor to:
      provide data to a plurality of servers for presenting an impression to a first plurality of user devices by a web browser or a digital application that does not support third-party cookies;
      provide a combination of location and time parameters to the plurality of servers, wherein the location parameters indicate one or more location identifiers identifying a specified location within a geographic region and the time parameters indicate one or more time identifiers identifying specified time increments within a time period;

request, from the plurality of servers, impression data associated with the combination of location and time parameters filtered based on a finding that the impression occurred one or more times in the specified location compatible with the one or more location identifiers and within the time period compatible with the one or more time identifiers, wherein the impression data includes one or more of: content of the impression, length of time the impression was displayed, and/or location at which the impression was displayed;

receive, from the plurality of servers, simultaneous data feeds including the impression data associated with the combination of location and time parameters, wherein the impression data is collected in real time based on the specified location and time increments within the time period and does not tie specific users to the plurality of user devices;

identify, based on historical impression data, patterns in device activity data related to the impression;

for each of the first plurality of user devices:
  identify, from impression data associated with the combination of location and time parameters, device activity data associated with content of the impression;
  identify a user input sequence from the device activity data associated with content of the impression; and
  determine whether the user input sequence matches at least one of the identified patterns in device activity data;

determine, as a function of determined matches, a rating indicating the effectiveness of the impression associated with the combination of location and time parameters;

determine that the rating exceeds an expected value; and in response to said determination, request the plurality of servers to provide the data for presenting the impression to a second plurality of user devices filtered based on a finding that the impression occurred one or more times in the specified location compatible with the one or more location identifiers and within the time period compatible with the one or more time identifiers, wherein the number of user devices in the second plurality of user devices exceeds the number of user devices in the first plurality of user devices.

9. The system of claim 8, wherein the combination of location and time parameters is a first combination of location and time parameters, the memory including further instructions that when executed, cause the processor to:
  determine that the rating does not exceed an expected value;
  in response to said determination, select a second combination of location and time parameters that is different from the first combination of location and time parameters; and
  provide the second combination of location and time parameters to the plurality of servers for analysis according to the instructions of claim 8.

10. The system of claim 9, wherein the instructions for selecting the second combination of location and time parameters comprise instructions that when executed, cause the processor to:
  randomly select location and time parameters for the second combination of location and time parameters;
  determine that the second combination of location and time parameters has not been provided to the plurality of the servers for analysis; and
  in response to said determination, select the second combination of location and time parameters.

11. The system of claim 8, wherein the instructions for identifying the user input sequence from the device activity data comprise instructions for:
  identifying that the impression data associated with the combination of location and time parameters indicates user input that includes a web search, access of a website, downloading of data, or completion of a purchase related to a product, company, or platform related to the impression;
  identifying, from the impression data associated with the combination of location and time parameters, a time that the user device displayed the impression; and
  identifying that the user input was provided within a certain proximity to the time that the impression occurred.

12. A computer-implemented method for reconciling simultaneous data feeds including data that does not tie specific users to devices comprising:
  receiving data from a server for presenting an impression to a first plurality of user devices by a web browser or a digital application that does not support third-party cookies;
  receiving a combination of location and time parameters from the server, wherein the location parameters indicate one or more location identifiers identifying a specified location within a geographic region and the time parameters indicate one or more time identifiers identifying specified time increments within a time period;
  receiving, from the server, a request for impression data associated with the combination of location and time parameters filtered based on a finding that the impression occurred one or more times in the specified location compatible with the one or more location identifiers and within the time period compatible with the one or more time identifiers, wherein the impression data includes one or more of: content of the impression, length of time the impression was displayed, and/or location at which the impression was displayed;
  for each of the first plurality of user devices:
    determining whether the user device is in the specified location within the geographic region based on the one or more location identifiers;
    in response to determining that the user device is in the specified location within the geographic region, providing the data for presenting the impression to the user device to display during the time period; and
    collecting impression data associated with the user device in real time based on the specified location and time increments within the time period, wherein the impression data does not tie specific users to the plurality of user devices;
  generating simultaneous data feeds based on the impression data associated with the combination of location and time parameters;

providing the simultaneous data feeds to the server, wherein the impression data is used for determination of a rating indicating the effectiveness of the impression associated with the combination of location and time parameters;

determining that the rating exceeds an expected value; and in response to said determination, receiving a request from the server to provide the data for presenting the impression to a second plurality of user devices filtered based on a finding that the impression occurred one or more times in the specified location compatible with the one or more location identifiers and within the time period compatible with the one or more time identifiers, wherein the number of user devices in the second plurality of user devices exceeds the number of user devices in the first plurality of user devices.

13. The method of claim 12, wherein the time parameters indicate the specified time increments in units of days, hours or minutes.

14. The method of claim 12, wherein the location parameters indicate the specified location by a designated market area, a zip code, a city name, or geographical coordinates.

15. The method of claim 12, further comprising:
for each of the second plurality of user devices:
    determining whether the user device is in the specified location within the geographic region based on the one or more location identifiers; and
    in response to determining that the user device is in the specified location within the geographic region, providing the data for presenting the impression to the user device to display during the time period.

16. The method of claim 12, wherein the combination of location and time parameters is a first combination of location and time parameters, further comprising:
in response to a determination that the rating does not exceed an expected value, receiving from the server a second combination of location and time parameters that is different from the first combination of location and time parameters.

17. The method of claim 16, wherein the second combination of location and time parameters is randomly selected and has not been received from the server before.

18. The method of claim 12, wherein the impression data associated with the combination of location and time parameters includes data indicating device identification metadata, and device activity data collected from impression tables, pixel tables, postback tables, or auction data.

19. A system for reconciling simultaneous data feeds including data that does not tie specific users to devices comprising:
a processor; and
a memory including instructions that when executed, cause the processor to:
    receive data from a server for presenting an impression to a first plurality of user devices by a web browser or a digital application that does not support third-party cookies;
    receive a combination of location and time parameters from the server, wherein the location parameters indicate one or more location identifiers identifying a specified location within a geographic region and the time parameters indicate one or more time identifiers identifying specified time increments within a time period;
    receive, from the server, a request for impression data associated with the combination of location and time parameters filtered based on a finding that the impression occurred one or more times in the specified location compatible with the one or more location identifiers and within the time period compatible with the one or more time identifiers;
    for each of the first plurality of user devices:
        determine whether the user device is in the specified location within the geographic region based on the one or more location identifiers;
        in response to determining that the user device is in the specified location within the geographic region, provide the data for presenting the impression to the user device to display during the time period; and
        collect impression data associated with the user device in real time based on the specified location and time increments within the time period, wherein the impression data does not tie specific users to the plurality of user devices;
    generate simultaneous data feeds based on the impression data associated with the combination of location and time parameters;
    provide the simultaneous data feeds to the server, wherein the impression data is used for determination of a rating indicating the effectiveness of the impression associated with the combination of location and time parameters; and
    in response to the determination that the rating exceeds an expected value, receive a request from the server to provide the data for presenting the impression to a second plurality of user devices filtered based on a finding that the impression occurred one or more times in the specified location compatible with the one or more location identifiers and within the time period compatible with the one or more time identifiers, wherein the number of user devices in the second plurality of user devices exceeds the number of user devices in the first plurality of user devices.

20. The system of claim 19, the memory including further instructions that when executed, cause the processor to:
for each of the second plurality of user devices:
    determine whether the user device is in the specified location within the geographic region based on the one or more location identifiers; and
    in response to the determination that the user device is in the specified location within the geographic region, provide the data for presenting the impression to the user device to display during the time period.

21. The system of claim 19, wherein the combination of location and time parameters is a first combination of location and time parameters, the memory including further instructions that when executed, cause the processor to:
in response to a determination that the rating does not exceed an expected value, receive from the server a second combination of location and time parameters that is different from the first combination of location and time parameters.

22. The system of claim 21, wherein the second combination of location and time parameters is randomly selected and has not been received from the server before.

23. The system of claim 19, wherein the impression data associated with the combination of location and time parameters includes data indicating content of the impression, a time that the impression was displayed by the plurality of user devices, device identification metadata, and device activity data collected from impression tables, pixel tables, postback tables, or auction data.

* * * * *